United States Patent [19]

Austruy et al.

[11] Patent Number: 5,341,475
[45] Date of Patent: Aug. 23, 1994

[54] METHOD FOR EXCHANGING MESSAGES BETWEEN A SHARED MEMORY AND COMMUNICATION ADAPTERS USING AN EFFICIENT LOGICAL PROTOCOL

[75] Inventors: Pierre Austruy; Bernard Brezzo, both of Nice; Jean-Pierre Lips, Cagnes-sur-Mer; Bernard Naudin, Saint Laurent du Var; Jean Calvignac, La Gaude, all of France; Richard H. Waller, Chapel Hill, N.C.

[73] Assignee: International Business Machines Corporation, Armonk, N.Y.

[21] Appl. No.: 903,687

[22] Filed: Jun. 24, 1992

[30] Foreign Application Priority Data

Oct. 16, 1991 [EP] European Pat. Off. ......... 91480161.8

[51] Int. Cl.⁵ .............................................. G06F 13/00
[52] U.S. Cl. ..................................... 395/200; 370/94.1
[58] Field of Search .................... 395/200, 325, 425; 364/200; 370/94.1

[56] References Cited

U.S. PATENT DOCUMENTS 4,797,815  1/1989  Moore ................................ 364/200

FOREIGN PATENT DOCUMENTS

0365731  10/1988  European Pat. Off. ..... G06F 15/16
0317481  11/1988  European Pat. Off. ..... G06F 15/16

Primary Examiner—Dale M. Shaw
Assistant Examiner—Gaurav Bhatia
Attorney, Agent, or Firm—Joscelyn G. Cockburn

[57] ABSTRACT

This invention relates to a protocol implemented in a communication system for exchanging data and control messages between adapters to which are attached different users, and a shared memory subsystem comprising a depository storage, a manager of storage and a microprocessor. Such protocol enables the adapters to be the initiators of the transmission and reception of data by using the control lines that connect the manager of storage to all adapters in the same way as the data bus and the address bus. Moreover, the adapters slice the messages into data bursts to which are associated control words specifying the sizes, the owner and the position of the burst in the message. Consequently, those data bursts may be interleaved when transiting on the data bus without the intervention of the microprocessor for the routing, and they will be stored in or read from the depository storage according to the identification of the user in the control word. Therefore, only the shared memory needs to have a high capacity of storage, whereas the manager of storage and the adapters can operate with a reduced capacity of storage, and the time to send or to access a data burst is much more improved.

5 Claims, 9 Drawing Sheets

METHOD FOR EXCHANGING MESSAGES BETWEEN A SHARED MEMORY AND COMMUNICATION ADAPTERS USING AN EFFICIENT LOGICAL PROTOCOL

FIELD OF THE INVENTION

This invention relates to a method for exchanging messages between two entities that are a shared memory and communication adapters and, more particularly, to a method for allowing an efficient exchange of data and control messages between the two entities, at the level of data link layers.

BACKGROUND ART

Modern computer networks are designed in a highly structured way. To reduce their design complexity, the networks are organized as a series of layers, each one built upon its predecessor.

The OSI reference model has seven layers whose functions are defined according to the international standardized protocols. The first layer which is the physical-layer, is concerned with transmitting raw bits Over a communication channel. Whereas the second layer which is the data link layer, is to take a raw transmission facility and transform it into a line that appears free of transmission errors to the network layer. To accomplish this goal, the data are broken up into frames, each of which is transmitted as many times as necessary to ensure that it has been received correctly. To prevent a fast sender from overrunning a slow receiver, the data link protocol always provides for flow control.

The environment in which the present invention can be implemented is described in detail in EP patent application A 365 731. In such an environment the subject invention deals with a method for defining a reliable and efficient exchange of data at the level of data link layers between two machines physically connected with a coaxial cable (for example the main central control unit comprising a shared memory and an adapter attached to different users). Therefore, the logical protocol has to establish an efficient exchange of data and control flow between the shared memory subsystem and the communication adapters.

The constraints given by the environment are multiple and known by the man skilled in the art. As each communication adapter may house one or several logical users, the flow of data for each user must be easily differentiated on the interface which is between the adapters and a depository storage of the central control unit. Multiple adapters must be able to share the same physical interface which can be named the manager of storage.

The most important constraint is that the adapters must be the initiators of all data exchanges, for the reception as well as for the transmission. This particular type of protocol springs from the notion of slave and master, where all the adapters are considered as masters and the shared memory as a slave.

Besides, in order to avoid the obstruction of the data transmissions, the exchanges of data and control messages must be flow-controlled in both ways from the shared memory to the adapters as well as from the adapters to the shared memory.

Therefore, the main object of the present invention is to provide protocols for exchanging messages between communication adapters and shared memory subsystem comprising a depository storage, a manager of storage and a microprocessor according an efficient data link protocol.

SUMMARY OF THE INVENTION

The exchange protocol according to the present invention improves the performance of the data processing and transmission by using the identification of the owner of the message (the logical user) to store them instead of using the address of the destination of the message and by organizing a new way of exchanging bursts of data. This type of protocol enables the adapters to operate the processing and the transmissions of their own data, and it does also enable the bursts of the received and transmitted messages to be interleaved. Therefore, only the shared memory needs to have a high capacity of storage, whereas the manager of storage and the adapters can operate with a reduced capacity of storage, and the time to access to the data is much more improved.

The methods according to the present invention are implemented in a communication system comprising communication adapters to which are attached different users and a shared memory subsystem comprising a depository storage and a manager of said depository storage, wherein the adapters are connected to the subsystem by a bus comprising data bus, address lines and control lines.

The receiving method allows messages sliced into data bursts of variable sizes sent by the users attached to the adapters to be received by the subsystem through the bus and arranged into the depository storage.

It comprises the steps of:

(a) providing a first unique data flow control line RBE connecting the manager of storage to all communication adapters and asserted by the manager of storage to allow the sending of the data bursts from adapters;

(b) making a bus request to the arbiter by communication adapters that have messages to send to the shared memory subsystem;

(c) generating a burst control word associated to each data burst to be sent by the communication adapters, said control word comprising at least the identification of the user owner of the message;

(d) sending a burst of data to which is associated the corresponding control word on data bus by one of the communication adapters selected by the arbiter with a unique address for all adapters on the address lines to the subsystem;

(e) reading the control word by the manager of storage to store the data burst in the depository storage according to the identification of the user owner of the message.

The transmitting method allows messages sliced into data bursts of variable sizes to be transmitted from the manager of storage to the adapters through the bus.

It comprises the steps of:

(a) dequeueing a message from the depository storage;

(b) sending a first control information (MRX) indicating that a message is ready for Transmission to the concerned communication adapter through the bus, said first control information comprising at least the identification of the user to whom the message has to be transmitted on data bus with a special code on address lines;

(c) providing a second unique data flow control line XBE connecting the manager of storage to all communication adapters and asserted by the manager of storage to allow the adapters to request data bursts from the shared memory subsystem;

(d) making a bus request to the arbiter by the communication adapters that have messages to receive from the shared memory subsystem;

(e) generating a second control information Transmit Burst Request (XBR) for requesting the transmission of a burst comprising at least the identification of the user and the maximum burst size of the requested data burst that can be processed by the adapter, said (XBR) is sent on the data bus from the communication adapter selected by the arbiter with a unique address for all adapters on the address lines to the subsystem;

(f) fetching the requested data burst whose size must be below the maximum demanded by the adapter, in the depository storage to store them temporarily in the manager of storage;

(g) providing third data flow control lines Transmit Burst Ready (XBY) connecting said the manager of storage to each adapter and asserted by that manager to notify the concerned communication adapter to read the requested data burst in the manager of storage;

(h) making a bus request to the arbiter by the concerned communication adapter that have messages to receive from the shared memory subsystem;

(i) sending a burst of data to which is associated a burst control word on data bus by the manager of storage when the arbiter has granted the bus, said control word comprising at least the identification of the user owner of the data;

(j) reading the control word by the adapter to check if the data that follow correspond to the requested data burst to send that data burst to the destination user indicated in the control word;

(k) sending a third control information End of Message (EOM) indicating if the complete message has been transmitted to the subsystem by the adapter, said third control information comprising at least the identification of the user to which the message has been transmitted and the notification of good or bad transmission.

According an additional feature of the subject invention, the control flow of the messages exchanged between the adapters and the shared memory subsystem is managed by the microprocessor included in the shared memory subsystem by:

(a) sending a command from the microprocessor to a concerned communication adapter through the -bus which has been granted by the arbiter, said command comprising at least the identification of the concerned adapter on the data bus with a special code on the address lines;

(b) answering back immediately a Response by the adapter on data bus after the execution of the command to free the bus.

BRIEF DESCRIPTION OF THE DRAWINGS

FIG. 6 comprising

DETAILED DESCRIPTION OF THE INVENTION

Figure 1:
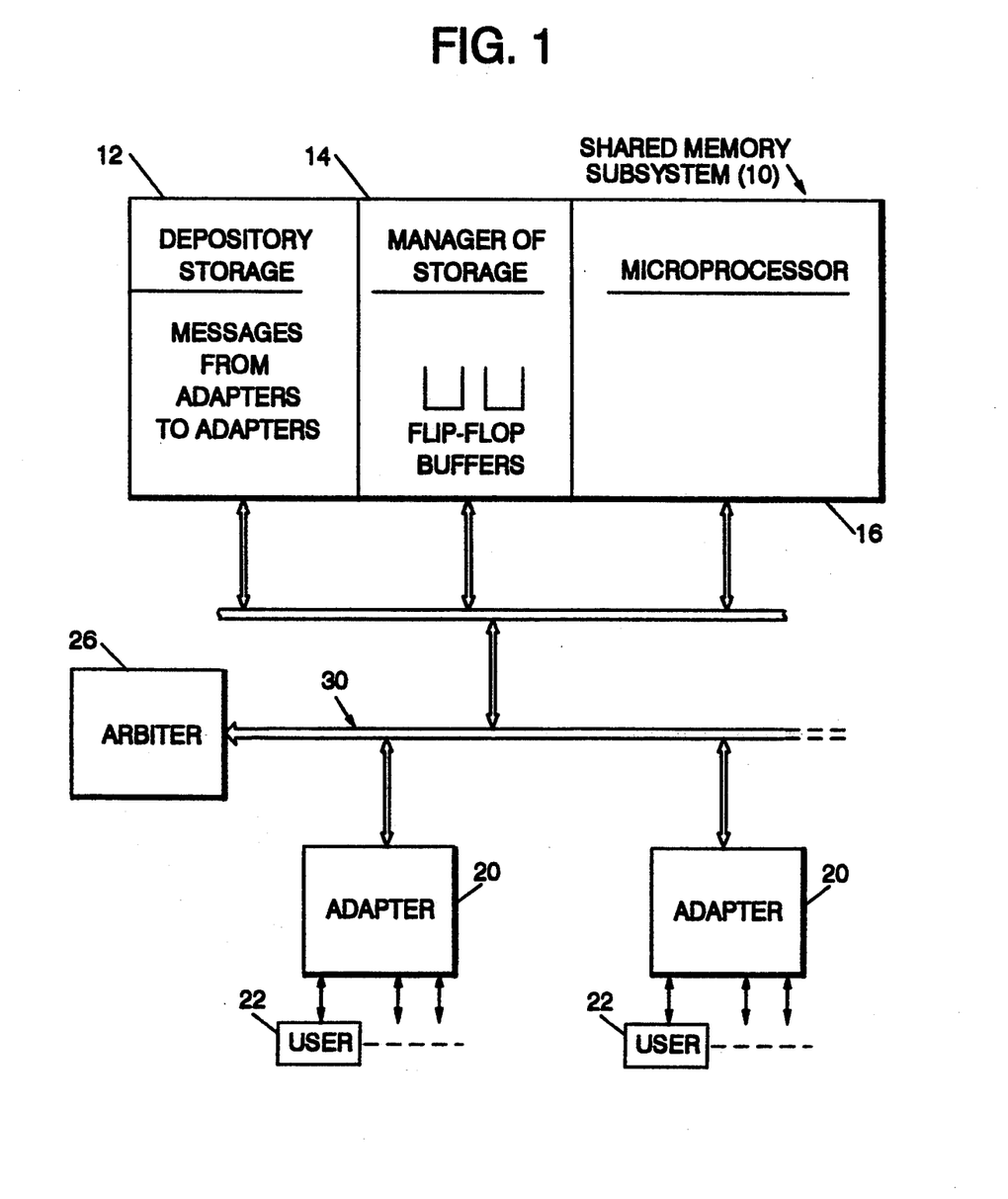
FIG. 1 shows the general environment in which the present invention is incorporated.

FIG. 1 represents the block diagram of a communication system in which the mechanism of the present invention of exchanging data and control between the shared memory subsystem(10) and the adapters (20) is incorporated. It schematically shows the link between two entities: on one side the adapters and on the other side the shared memory subsystem viewed from the adapters.

Box 10 shows a shared memory subsystem which houses a depository storage (12) for keeping data messages coming from the adapters or prepared for going to the adapters, a manager of storage (14) for controlling the data movement, and a microprocessor (16) for processing the data messages and controlling the subsystem and the adapters. The different functions of the manager of storage and the microprocessor will be described in details later on.

The memory is shared by a plurality of logical users (22) which are connected to the communication adapters (20). Each adapter is connected to several users, which enables each user to communicate with another user connected to the same adapter as well as another user connected to a different adapter through a bus (30) whose access is controlled by an arbiter (26).

The depository storage (12) essentially holds information organized in two different ways: the messages received from or to be transmitted to the users through the manager of storage (14), bus (30) and adapters (20). All the messages are organized according to a certain structure of frames. When the data are exchanged using the high level data link control (HDLC) protocols, the messages are made by the HDLC frames separated by flags.

A manager of storage which can be used with the mechanism of the present invention is described more in details in EP application A 365 731. Such manager of storage comprises a data storage interface (DSI) and a central control (DCS). The central control (DCS) receives global orders such as enqueue, dequeue, lease buffer, release buffer etc . . . from the interface and the microprocessor, processes these orders and generates responses. The data store interface (DSI) controls the data movement by performing the chaining of the data messages received from the users attached to the adapter and the data enqueueing into the link inbound queues (LIQ), and the sending of the data messages dequeued from the link outbound queues (LOQ) to the destination users. The DSI does also have a set of flip-flop buffers (a flip-flop set in "Receive" and another in "Transmit") to store temporarily the data bursts before it sends them to the depository storage or the adapters.

As said before, one specific microprocessor (16) is provided to perform functions such as initialization, error processing, and message routing table set up. It controls the subsystem and the adapters.

Figure 2:
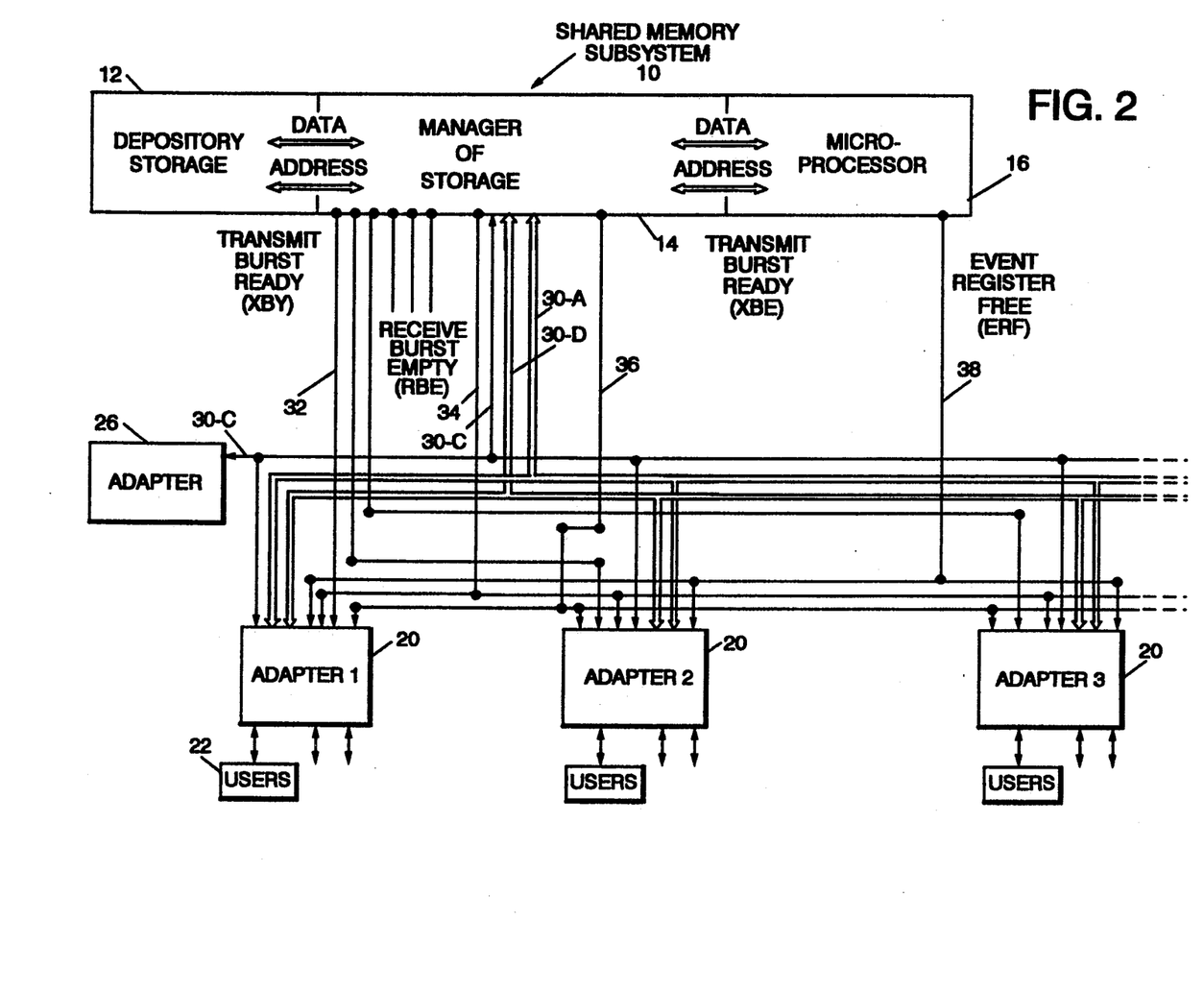
FIG. 2 represents the exchanges of data and control between adapters and the shared memory subsystem.

FIG. 2 shows the exchanges of data and control between the shared memory subsystem and the adapters.

There are three kinds of link between the two entities:

the message bus (30-a, 30-d, 30-c) that are used for the transportation of data and messages received or transmitted;

common control lines (34, 36, 38) connected to all adapters;

and other specific control lines (32) connected to every adapter.

They are described here in order to understand for what purpose they are supposed to be used. But the sequencing of their operations will be explained in the description of the other drawings.

The message bus (30-d, 30-a, 30-c) comprise data bus (30-d), address bus or address lines (30-a) and control lines (30-c):

the data bus (30-d) is a bidirectional set of lines that is used to transport data which are sliced into bursts whose description will be detailed later on, in FIG. 4 it connects the manager of storage (14), the microprocessor (16) and all adapters (20);

the address bus (30-a) is a set of lines which is used to specify a resource within a device connected to the bus which should operate for a particular operation, it does also connect the manager of storage (14), the microprocessor (16) and all adapters (20);

the control lines (30-c) are used to transmit signals for different purposes, for instance the bus request to be transmitted to arbiter (26) which has to grant the bus according to its own algorithm, the basic cycle for read as well as for write to enable the timing of each operation. The control lines connect the manager of storage (14), the microprocessor (16), the arbiter (26) and all adapters (20).

The common lines (34, 36, 38) connected to all adapters (20) are:

The Receive Burst Empty line (34) (RBE): which transmits signal coming from the manager of storage (14) to all the adapters to enable one of them to send a Receive Data Burst to the Shared Memory Subsystem. It should be written from now on that "Receive" means that the data are going from the adapters to the shared memory. This line can be set "on" (asserted) or "off" (deasserted). When the receive burst empty line is "on", it allows all the users to send their data in the Receive Data Bursts (RDB) on the message bus (30) through the adapters, after having done a bus request to arbiter (26). There are possible interleaves of receive bursts for different users. Therefore, in order to manage the data flow, the receive burst empty may be set "off", which means that no adapter is allowed to send their data in the Receive Data Bursts to the shared memory. When the RBE tag is deasserted the adapter has to remove its bus request only if its bus request was not granted.

The Transmit Burst Empty line (36) (XBE): which also transmits signal coming from the manager of storage ( 14 ) to all the adapters to enable one of them to send a Transmit Burst Request to the Subsystem. It should also be mentioned from now on that "Transmit" means the data are going from the shared memory to all the adapters or one specific adapter. When XBE line is "on", the adapters may send their Transmit Burst Request (XBR) to the manager of storage in order to get the expected data, after having requested the bus to the arbiter (26) . To avoid the overrun of the manager of storage, the Transmit Burst Empty (XBE) may be set "off" to stop the sending of the Transmit Burst Requests (XBR) from the adapters.

The Event Registers Free line (38) (ERF): which comes from the microprocessor (16) to all the adapters. It is used to allow or to stop the adapters to pass asynchronous events stored in Event Register which is in the depository storage to the microprocessor, and also to enable the microprocessor to send a delayed request to the adapters. The chaining of these operations will be described in FIG. 3.

Specific lines (32) which are the Transmit Burst Ready lines (XBY) represent signals coming from the manager of storage to a selected adapter to whom the message has to be transmitted. The Transmit Burst Ready is set "on" when the manager of storage is ready to send the message found in the data storage to the adapter that has already transmitted a data burst request. XBY is set "off" when the data has not been fetched yet in the depository storage by the manager of storage.

Figure 3:
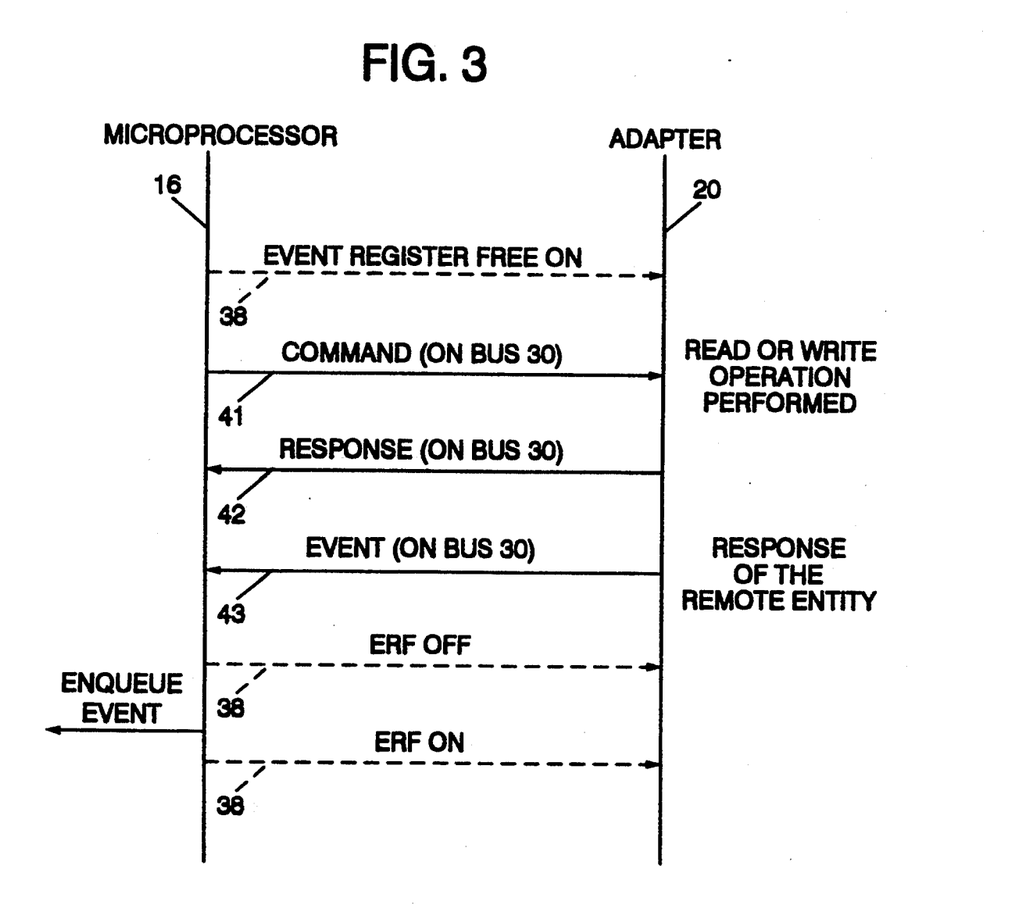
FIG. 3 shows the control flow from adapters to memory as well as from the shared memory to adapters.

FIG. 3 shows the control flow between the adapters and the shared memory subsystem, and more particularly the microprocessor. This control flow is illustrated by a flow-chart which represents the chaining of the operations of "Command" (41), "Response" (42), and "Event" (43) according to the status of the Event Registers Free line (38). Those three commands are defined as bursts which are sent on bus (30).

The Command and Response registers are provided in the microprocessor and adapter respectively to handle control messages from the microprocessor. Therefore, the shared memory subsystem may send an instruction through a Command (41) to every attached adapter and each adapter provides an entry point for this Command. After the execution of the instruction, a Response (42) must be sent back immediately by the adapter(s). Besides, the flow-control of the Commands is under responsibility of the shared memory subsystem.

When the microprocessor (16) wants to access a resource in a remote entity (22), it may send a Command (41) to the corresponding adapter (20). This command is a write command that is decoded in the adapter. This adapter answers to the microprocessor (16) an immediate Response (42) on bus (30). Then, it transfers the command to the remote entity (22) which will gives afterwards its response thru an Event (43) later on, according to the Event Register Free line (38).

Consequently, the Event (43) is used to pass asynchronous events and to carry the delayed responses of remote entities (22) through the adapters to the microprocessor. These events may house error messages from the adapters. In order to avoid a too long waiting time for the processor, it is implemented a special mechanism in the adapters to manage the Commands to these remote entities. This adapter mechanism receives the Command from the microprocessor thru a request on bus (30) and sends back immediately a Response to free the processor for some other operations. It will then take in charge the sending of the command to the remote entity and will pass the response of this command as an Event to the microprocessor. When the adapter writes into the Event, the bus (30) is locked. At the same time, the Event Registers Free is deasserted. This avoids any other attempt to write these registers. Once the Event has been enqueued, the Event Registers Free is set "on" allowing another operation on bus (30).

The principal characteristics of the Event bursts is that there is a unique entry point for all the adapters, where they can put control information to be passed to the microprocessor (16) located in the shared memory subsystem. To each Event burst may be associated additional information for routing the Event to its destination which may be another user.

Figure 4:
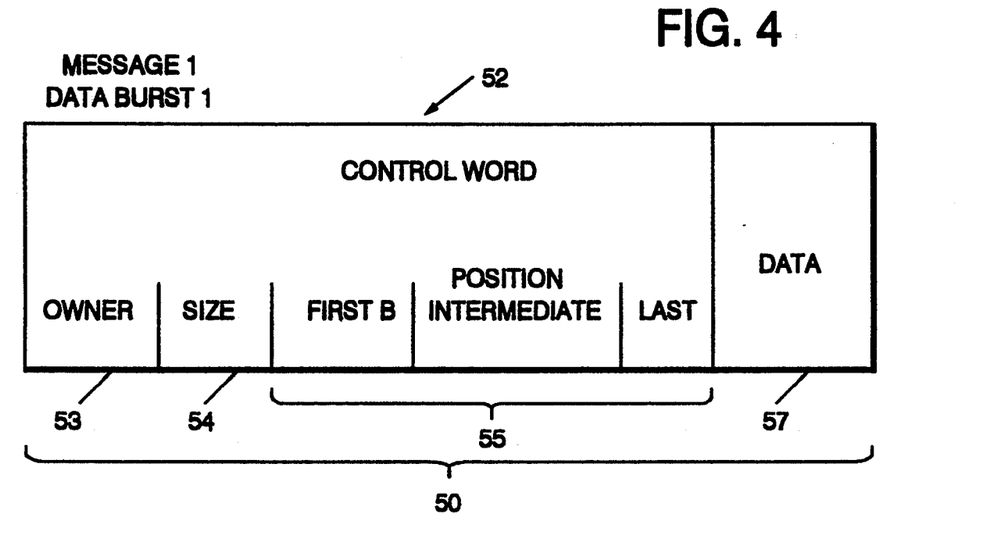
FIG. 4 represents a control word associated to a burst of data.

FIG. 4 shows the Control Word generated by the adapter and associated to each burst of data.

In both ways of exchanges, the messages are sliced into bursts (50) whose characteristics such as length are defined by the adapters. Therefore, for each burst of data (50), the adapters have to generate a Control Word (52) which specifies:

the user owner (53) of the data burst (for example the logical user);
the size (54) of the data burst;
the position (55) of the burst in the message, i.e. first burst, intermediate burst, last burst.

That type of Control Word is associated to each data (57) for the Receive Data Burst (RDB) as well as for the Transmit Data Burst (XDB) to be described later on in FIGS. 5A-5B-5C and FIGS. 6A-6B. FIG.

Figure 5A:
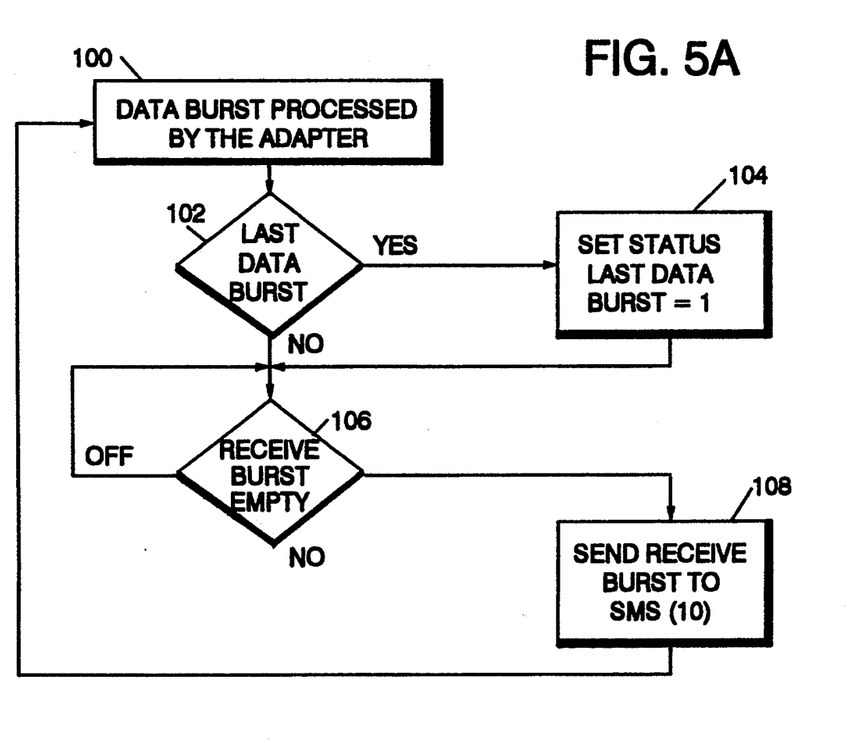
FIG. 5A shows the Receive Data Burst flow chart in the adapters.

FIG. 5A shows the flow chart of the Receive Data Burst coming from the adapters to the shared memory subsystem. This flow chart concerns the adapters operations and represents the sending of "Receive Data Burst" (RDB) according to the status of the "Receive Burst Empty" (RBE).

When the adapter processes a message from one of the users at step (100), it has to write in the control word the position of the data burst in the message at step (102). In case it is the last data burst, the adapter sets in a status register assigned to the user the status last data burst=1 at step (104). At step (106), the adapter is ready to send the data burst comprising the control word and the data to the shared memory subsystem, but it has to check the status of the Receive Burst Empty line (RBE). The adapter will send the Receive Data Burst at step (108) once the previous said line is set "on", and if the bus request is granted by adapter (26). When the RBE tag is deasserted, the adapter has to remove its bus request only if the bus request was not granted.

Those operations will be processed until the last data burst is sent to the shared memory subsystem, and automatically the register last data burst is set=0. After receiving the last data burst, the manager of storage enqueues the whole message in the "LIQ" inbound queue (refer to EP application A 365 731). Each data burst is written into the depository storage (12) using the information contained in the control word to chain the burst to the user link inbound queue and enqueue the whole message to said queue when the last burst is received.

Figure 5B:
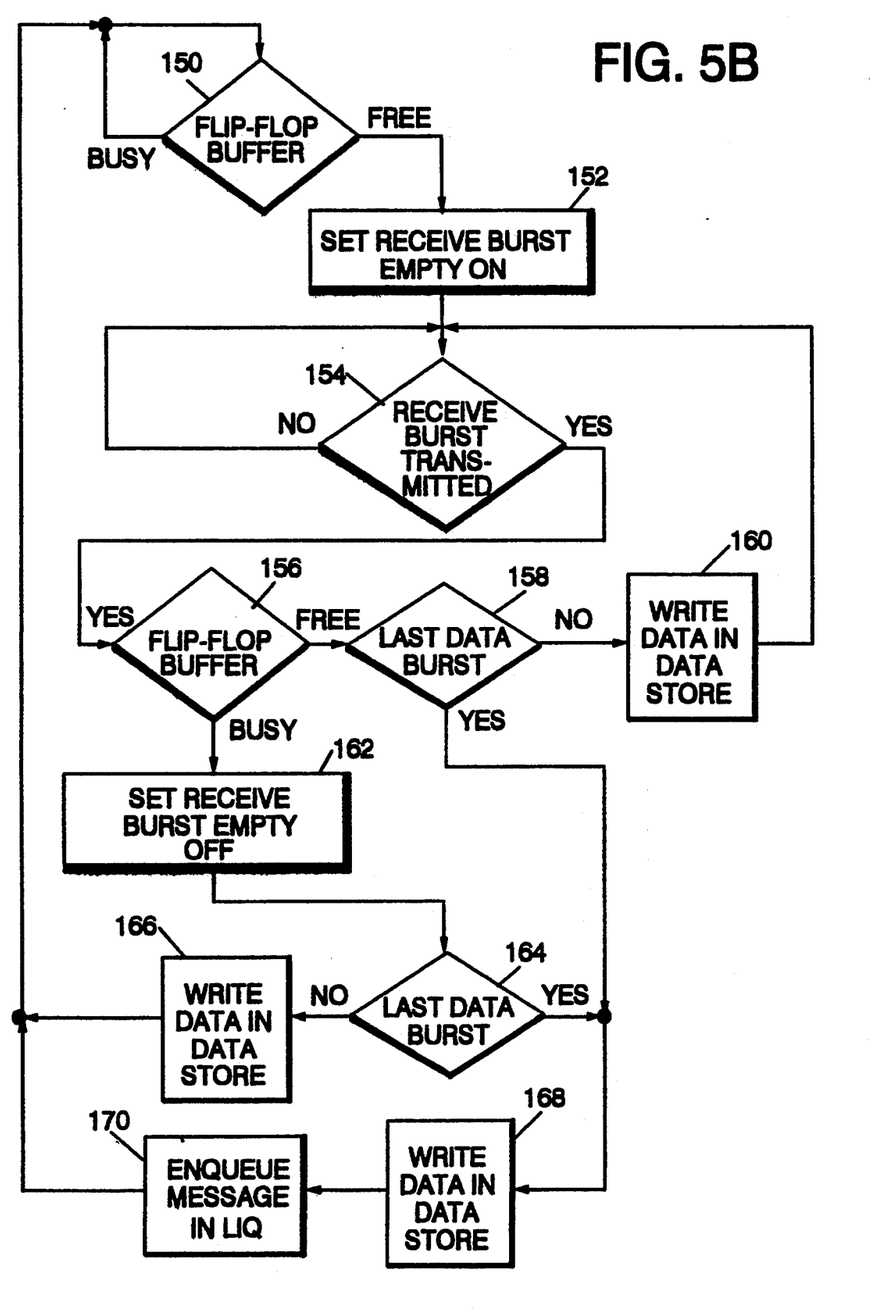
FIG. 5B shows the Receive Data Burst flow chart in the Shared Memory Subsystem.

FIG. 5B represents the flow-chart of the Receive Data Burst in the shared memory subsystem which follows the different steps of the operations according to the status of a flip-flop buffer (free or busy), as described above referenced patent application. For the transfer of data between the adapter (20) to the depository storage (12), the manager of storage uses a "receive" flip-flop buffer to store temporarily the data burst. Therefore, as long as no flip-flop buffer is free, the Receive Burst Empty line is set "off" to all the adapters as is shown steps (150) and (152). Once the RBE is asserted, the manager of storage will wait until it receives a Receive Data Burst from one of the adapters, step (154).

Afterwards, if one buffer is still free at step (156), the data store interface of the manager of storage has to check if the data received is the last data burst, step (158). Thereafter, the data will be written in the depository storage using the user identification and burst size information contained in the control word, in step (160) if it is not the last data burst, yet.

If the flip-flop buffers are busy, the Receive Burst Empty is set "off" at step (162). As previously described, before the data is written in depository storage step (166), the DSI has to check if it is the last data burst in step (164). The DSI will be resumed in the step (150) until the last data burst is received.

In case the last data burst is detected, after the data is written in the data store in step (168), the manager of storage enqueues the data in the LIQ in step (170), using the user identification and other information contained in the control word. This will end the processing of the data received by the shared memory subsystem, and the Receive Burst Empty is set "on" immediately as soon as one of the flip-flop buffers are free.

Figure 5C:
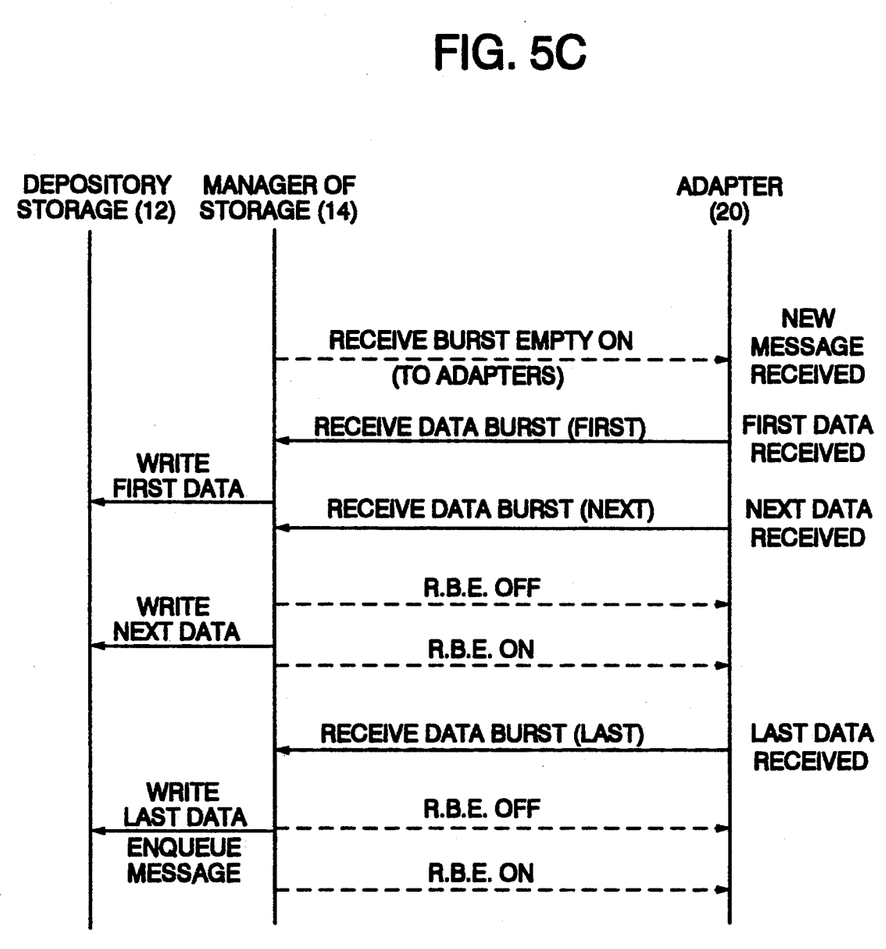
FIG. 5C gives an example of a message received in the Shared Memory Subsystem.

FIG. 5C gives an example of message received in the shared memory subsystem to illustrate the flow-chart described before.

Three entities are schematically shown on the figure: the depository storage (12), the manager of storage (14), and an adapter (20) whose attached remote entity is the initiator of the Receive Message.

First, the Receive Burst Empty line has to be set "on" to all adapters, which means that one of the flip-flop buffers is free. When an adapter receives a message from one of the users, it sends the first Receive Data Burst to the manager of storage that writes that first data burst in the depository storage without setting the RBE line "off" because the flip-flop buffer is still free.

Afterwards, the adapter may send the next Receive Data Burst. But the RBE line is immediately set "off" to stop the sending of data because both flip-flop buffers are busy. This allows the manager of storage to write the data in the depository storage, which set on the RBE line.

For the last Receive Data Burst, the manager of storage will write the last data in the depository storage and enqueue the message. The RBE line will also be set "on" to allow another adapter to send another burst.

FIG. 6 shows the flow-chart of the Transmit Data Burst concerning the adapters and the shared memory subsystem. This figure does not aim to explain in details the different sequences of the operations followed by the adapters and the manager of storage. The main steps are given in order to understand the data transmissions from the shared memory subsystem to a selected adapter or all of them.

Figure 6A:
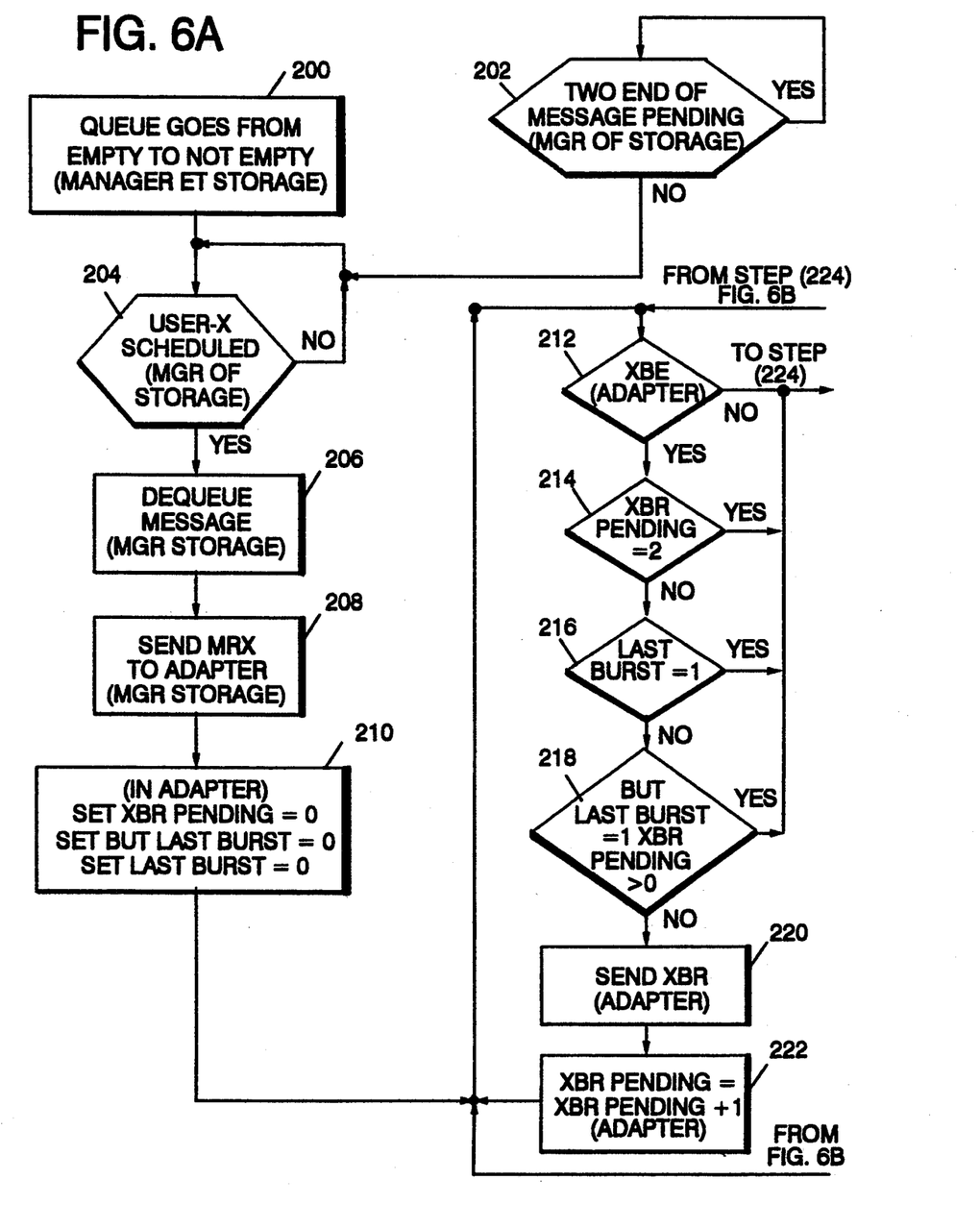
FIGS. 6A, 6B shows the Transmit Data Burst flow chart in general.

FIG. 6A. It must stay in mind that the adapters are always the initiators of the transmitting process each time that the shared memory has a message to transmit to a specific user connected to an adapter. All the messages are stored in the depository storage and will be kept in the queue as long as the adapter will not be ready to receive the data. However, the manager of storage must notify the concerned adapter that it has a message. Two buffers are available and they have the same memory mapped location for the adapters, a Transmit flip buffer and a Transmit flop buffer. Those two buffers allow to transmit data burst to the selected adapter while, if needed, fetching the next data burst in the depository storage.

Step (200) starts when the link outbound message queue goes from empty to not empty, and by the way, it is also tested in step (202) if there are still two pending End of Message. The manager of storage may anticipate the transmissions of the messages, it can only manage two pending messages. Once it has loaded the last burst of one of the two messages, it checks at step (204) if the user to which the message has to be transmitted, is scheduled.

At step (206), the transmission process begins. The manager of storage dequeues the message from the depository storage (from the LOQ outbound message queues, refer to the EP application 365 731). It sends at step (208) the Message Ready for Transmission (MRX) to the selected adapter to which the user is connected, through the bus (30). The MRX comprises the identification of the destination user and a specific code on the address line of bus (30), stating that the data on data lines are MRX data.

The adapter sets in a working register, at step (210):
the "XBR pending=0"
the "But last burst=0"
the "Last burst=0"

This information is necessary for the adapter to send a correct number of Transmit Burst Request (XBR) to the manager of storage, or sometimes one more than the necessary number, when the adapter is unable to detect the but last burst.

The XBR comprises the control word information on data lines of bus (30-d) and a specific code on the address lines of bus (30-a) stating that the data on data lines are XBR data. XBR data comprise the user identification and the maximum burst size that can be processed by the adapter.

It is then checked by the adapter at step (212) if the Transmit Burst Empty (XBE) is asserted by the manager of storage. If yes, then it tests if there are already two pending XBR at step (214), which means that the manager of storage cannot accept any other (XBR). If no, it may check at step (216) the status of the register "last burst". If it is not set equal to 1, the adapter will verify the status of the register "but last burst=1" and the "XBR pending>0" at step (218). If one of the conditions is not valid, its means that the manager of storage may receive another XBR or two other XBR (if it starts transmitting the message).

The three steps (214, 216, 218) has the same output to step (224) on FIG. 6-2a if their conditions are satisfied. It is also the output of step (212) when the XBE is deasserted, this output means that it is no use for the adapter to send another XBR.

Therefore, at step (220), the adapter may send a XBR, which will increment the register XBR pending at step (222).

Then the scheduling process is resumed at step (212).

Figure 6B:
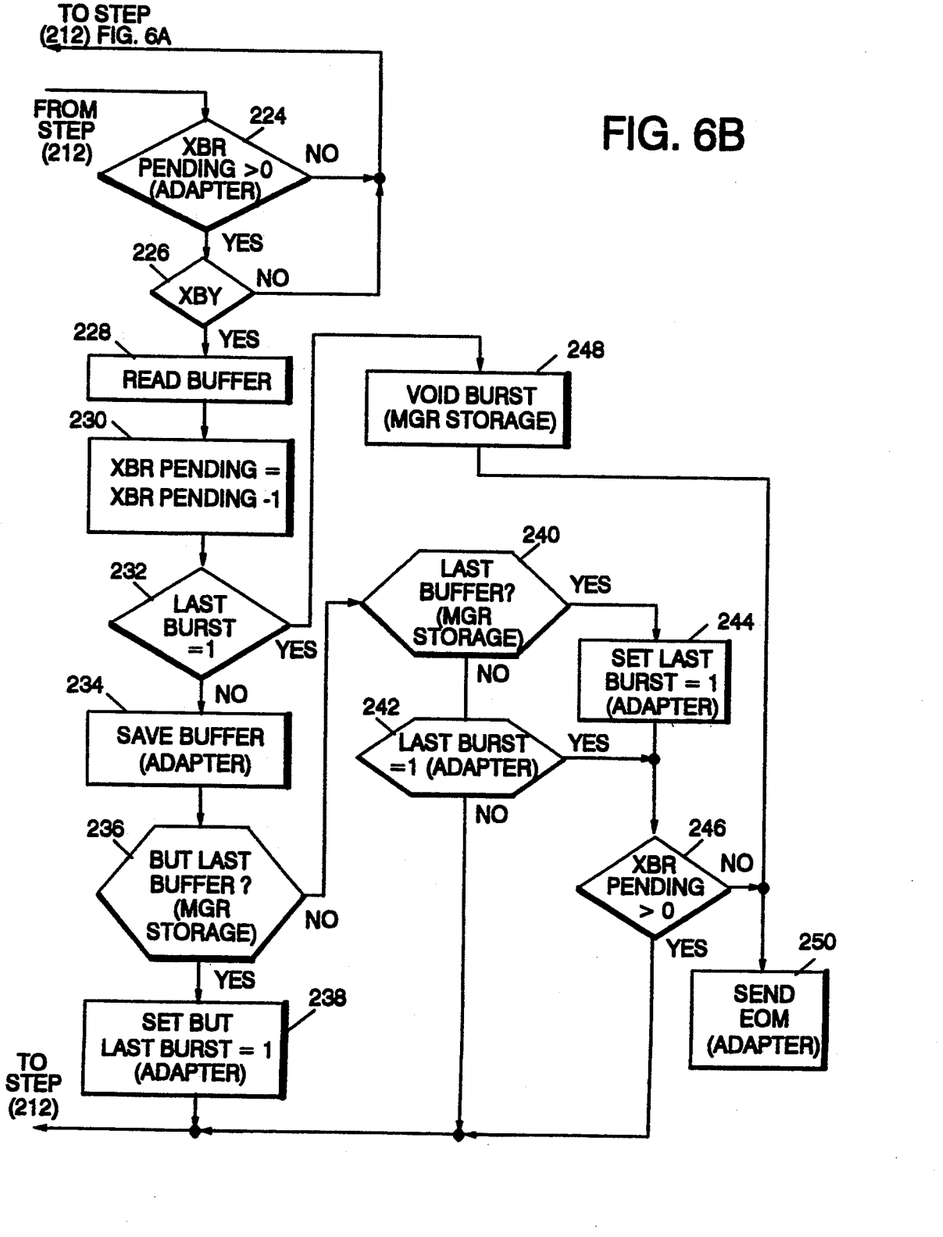

FIG. 6B completes the FIG. 6A to illustrate the Transmit Data Burst flow-chart.

At step (224), the adapter checks if the XBR pending is >0. If yes, it will wait until it gets the Transmit Burst Ready (XBY) from the manager of storage, step (226), which means that the data has already been fetched in the depository storage. Most of time, the adapter does not have to wait because there are two buffers which enables the manager of storage to anticipate the transmission of the data. But if the XBY is set "off", the process is resumed to step (212).

Therefore, the adapter may read the buffer that stores temporarily the data at step (228). Then the XBR pending is decremented in step (230).

At step (232), the adapter checks if the register "last burst" is set to 1. In case of no, step (234), the adapter may save the data burst if it corresponds to the one expected. Otherwise, the manager of storage will send a void burst at step (248). Consequently, the adapter may send immediately an End of Message (EOM) to the depository storage at step (250).

By the way, in step (236) the manager of storage verifies in its own buffer if the next data burst to transmit is the but last burst. If yes, the adapter sets the register "but last burst=1" at step (238).

Then the process is resumed at step (212).

At step (236), if the buffer does not store the but last data burst, the manager of storage checks if it is the last data at step (240). If no, the adapter will test in its own register if the "last burst=1" at step (242). In case it is not the last burst the process will resume to step (212). Otherwise, the adapter has to be sure that XBR pending is equal to zero at step (246) to send at step (250) the EOM. If the XBR pending is >0, then there are still other bursts to be sent to the adapter and the process is resumed to step (212).

If at step (240) the data stored by the buffer is the last one, the adapter must set in its own register "last burst=1" at step (244). If the XBR pending is equal to zero at step (246), the adapter may send directly an EOM, otherwise, the process will be resumed to step (212).

Figure 7:
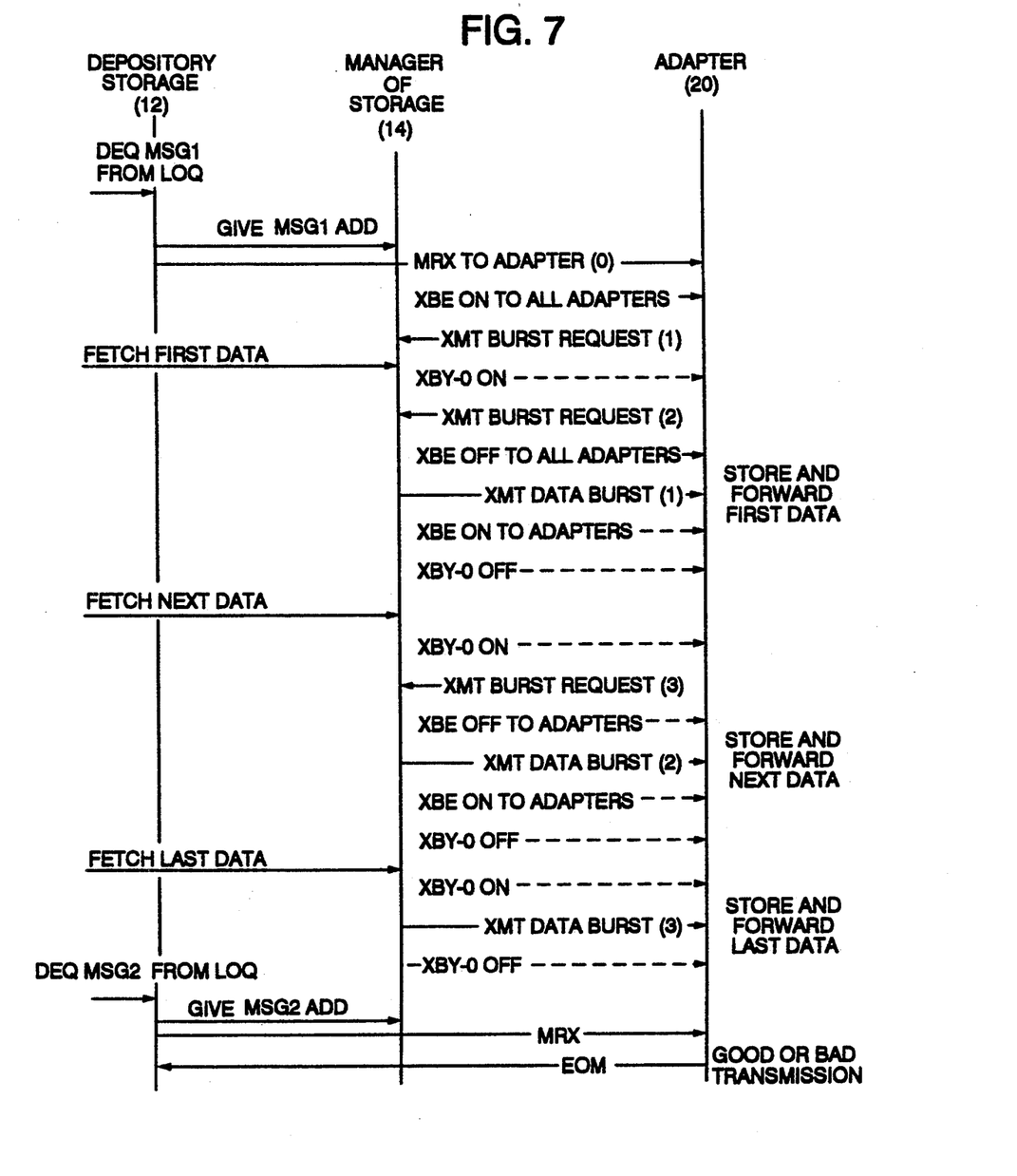
FIG. 7 gives an example of a message transmitted to an adapter.

FIG. 7 gives an example of a message transmitted to a user connected to a specific adapter-0.

After dequeueing the message 1 from the LOQ outbound message queues (refer to EP application 365 731), the depository storage (12) sends a Message Ready to Transmit (MRX) to adapter-0 once the address of the user is known. Immediately, the manager of storage sets "on" the XBE to enable the adapter-0 to send back the first Transmit Burst Request (XBR). The XBR data are received into the flip or flop control register.

During that time, the manager of storage has fetched the first data burst stored it in one of the free buffer and updated the flip or flop control register with the data burst size, which will be sent as a control word with the buffer contents. Then the XBY in set "on" for adapter-0. As there is still another buffer free because the XBE is still set "on", and the three conditions in steps (214, 216, 218) are not satisfied, the adapter sends another XBR (2). The manager of storage immediately sets the XBE "off"to all adapters. Therefore, adapter-0 reads the first Transmit Data Burst (XDB) in the corresponding buffer in order to free one of the buffer, stores and forwards that first data.

Thereafter, the XBE line is immediately set "on" as there is one buffer free, but the manager of storage is not ready yet. The XBY line is deasserted for adapter-0, and the manager of storage fetches the next data in the depository storage during that time. The XBY is set "on" as soon as the data is stored in the buffer. But the adapter still sends a XBR (3), which fills the buffer, the XBE is therefore deasserted. The data burst (2) may then be sent to adapter-0 that stores and forwards the data.

Once again the manager of storage fetches the last data exactly with the same process as described before, and sends it to adapter-0 which stores and forwards the last data.

The depository storage may dequeue another message from the LOQ and starts the transmitting process, while the adapter checks if there is any bad transmission of the data bursts of the message 1. Afterwards, it sends to the depository storage an End of Message (EOM) to notify if the transmission has been good or bad.

We claim:

1. A method for transmitting interleaved bursts of messages sent from a shared memory subsystem (10) comprising a storage (12) and managing means (14) for managing said storage, to a plurality of communication adapters (20) to which are attached different users (22), said adapters (20) being connected to the subsystem (10) by a bus (30) comprising data lines (30-d), address lines (30-a) and control lines (30-c) controlled by an arbiter (26), said messages being sliced into data bursts (57) of variable sizes, the method characterized in that it comprises the steps of:

(a) dequeueing a message from said storage (12);

(b) sending a first control information indicating that a message is ready for transmission (MRX) to a communication adapter (20), connected to a user (22) to whom the message is being sent, hereinafter, a selected communication adapter (20) through the bus (30), said first control information comprising at least the identification of the user (22) to whom the message has to be transmitted on said data lines (30-d) with a special code on said address lines (30-a);

(c) providing a second unique data flow control line XBE (36) connecting said selected communication managing means (14) to all said communication adapters (20) and asserted (20) by said managing means (14) to allow said adapters to request the data bursts from the shared memory subsystem (10);

(d) making a bus request to said arbiter (26) by the selected communication adapters (20) that have messages to receive from the shared memory subsystem (10);

(e) generating a second control information Transmit Burst Request (XBR) for requesting the transmission of a burst comprising at least the identification of the connected user and the maximum burst size of the requested data that can be processed by the adapter, said second control information (XBR) is sent on said data lines (30-d) of the bus (30) from the communication adapter (20) authorized by the arbiter (26) with a unique address for all adapters on said address lines (30-a) to the subsystem (10);

(f) fetching the requested data burst whose size must be below the maximum demanded by said selected adapter (20) in the depository storage (12) to store them temporarily in managing means (14);

(g) providing third data flow control lines Transmit Burst Ready (XBY) (32) connecting said managing means (14) to each adapter (20) and asserted by managing means (14) to notify the selected communication adapter (20) to read the requested data burst in managing means (14);

(h) making a bus request to said arbiter (26) by the selected communication adapters (20) that have messages to receive from the shared memory subsystem (10);

(i) sending a burst of data (50) to which is associated a burst control word (52) on said data lines (30-d) of said bus (30) by managing means (14) when said arbiter (26) has granted said bus (30), said control word (52) comprising at least the identification of the user of the data burst;

(j) reading said control word by said selected adapter (20) to check if the data that follow correspond to the requested data burst to send that data burst to the connected user indicated in the control word; and, (k) sending a third control information End of Message (EOM) indicating if the complete message has been transmitted to the subsystem (10) by said adapter (20), said third control information comprising at least the identification of the user (22) to which the message has been transmitted and the notification of good or bad transmission.

2. The method according to claim 1 characterized in that it comprises the steps of:

(a) providing in said managing means (14) for managing said storage a plurality of flip-flop buffers having the same memory mapped location for all the adapters (20), which enables said managing means (14) to interleave bursts of messages coming from different users (22);

(b) activating said second unique data flow control line (XBE) (36) by said managing means (14) when at least one buffer of said buffers is free to notify said adapters (20) to send said second control information Transmit Burst Request (XBR) according to its status;

(c) activating said third data flow control lines XBY (32) by said managing means (14) when the data burst has been fetched in said storage (12) and stored in one of the buffers of said managing means (14) to notify the selected adapter (20) to read in said buffer the requested data burst.

3. The method according to claims 1 or 2 characterized in that the burst control word specifies:

the user of the data burst (53);
the size of the data burst (54);
the position of the burst in the message (55).

4. A method for exchanging messages comprising and the transmitting method according to claims 1 or 2 wherein the control flow of the messages exchanged between the adapters (20) and the shared memory subsystem (10) is managed by a microprocessor (16) provided in said subsystem, characterized in that it comprises the steps of:

(a) sending a command (41) from said microprocessor (16) to a selected communication adapter (20) through the bus (30), after said bus (30) has been granted by said arbiter (26), said command comprising at least the identification of said selected adapter on said data lines (30-d) with a special code on said address lines (30-a);

(b) answering back immediately a Response (42) by said adapter (20) on data bus (30-d) after the execution of the command to free said bus (30).

5. The method according to claim 4 allowing to pass delayed responses from the users (22) attached to said communication adapters (20) characterized in that it comprises the steps of:

(a) providing a unique control flow control line Event Register Free (EPF) (38) connecting said microprocessor (16) to all said communication adapters (20) and asserted by said microprocessor (16) to enable said adapters (20) to send said delayed responses from attached users (22);

(b) making a bus request to said arbiter (26) by the communication adapters (20) that have delayed responses to send to the microprocessor (16);

(c) generating a control information Event (43) comprising the delayed response from the user associated with the identification of the user to send to said microprocessor (16) when said arbiter (26) has granted the bus (30), said control information being sent on data bus (30-d) according to the status of said (ERF) line (38); and (d) receiving said control information Event (43) by said microprocessor (16) and storing the delayed response contained therein in the storage (12) according to the identification of the user.

* * * * *